Feb. 26, 1957 J. E. HALE 2,782,841
PROJECTOR FOR FUEL COMBUSTION
Filed Nov. 3, 1950 4 Sheets-Sheet 2
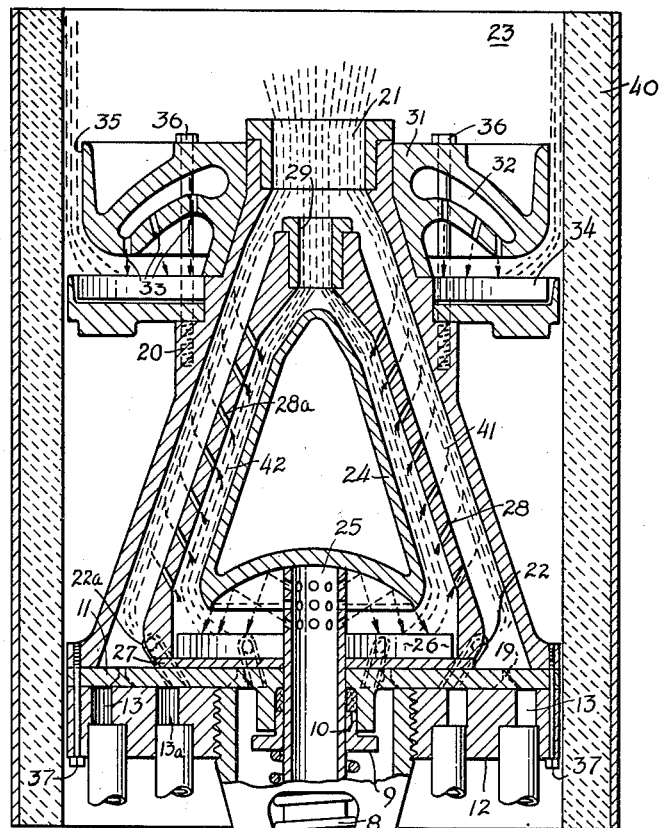
Fig. 4.
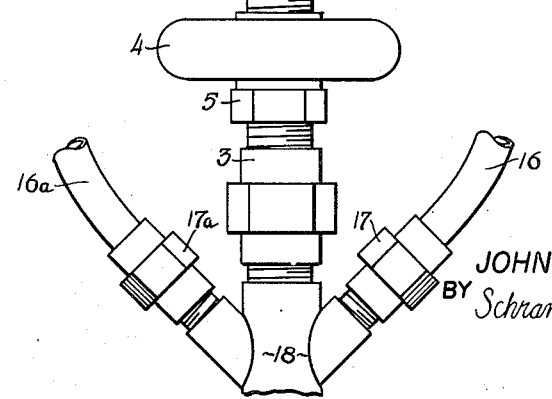
INVENTOR.
JOHN E. HALE
BY Schramm & Knowles
ATTORNEYS

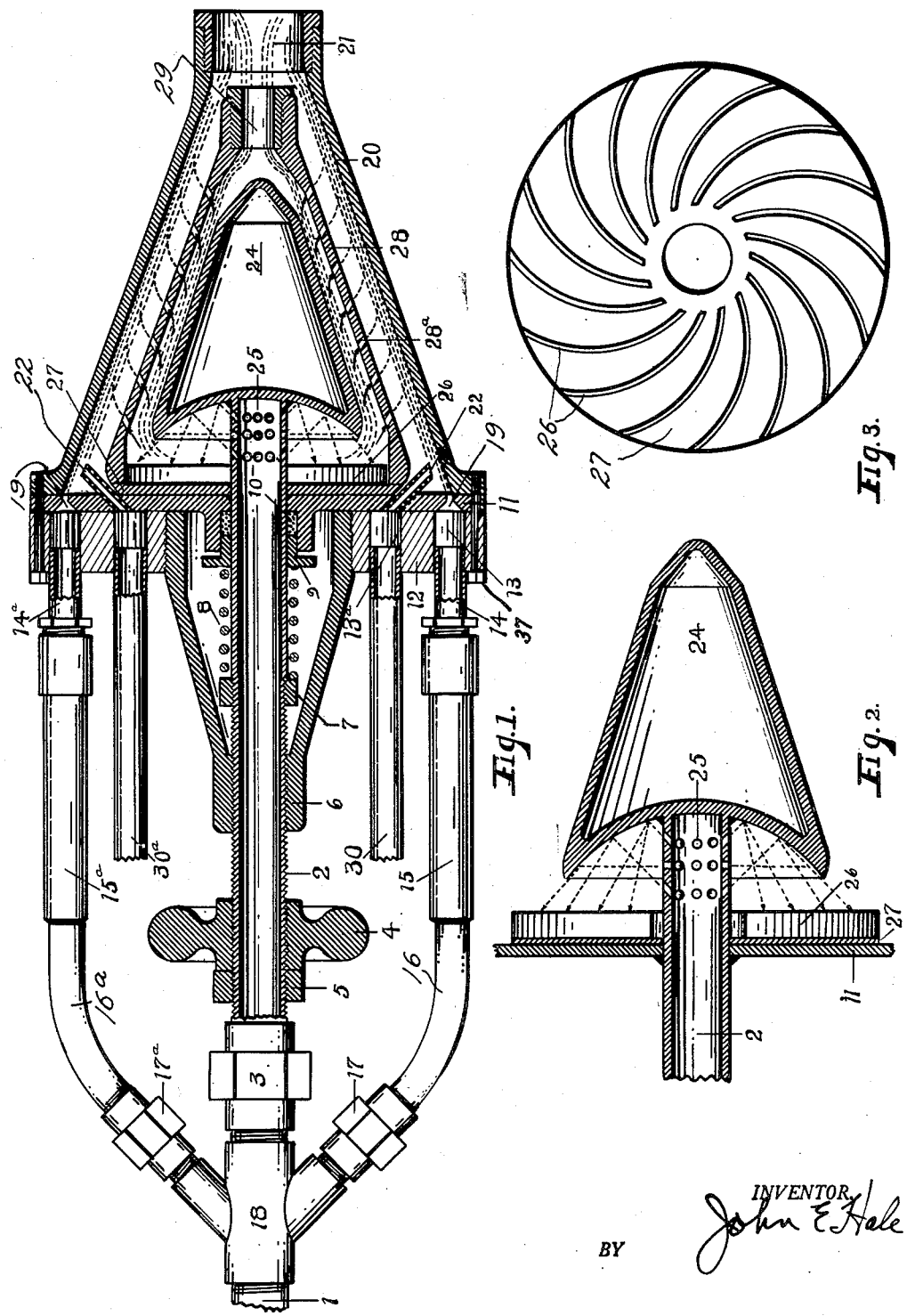

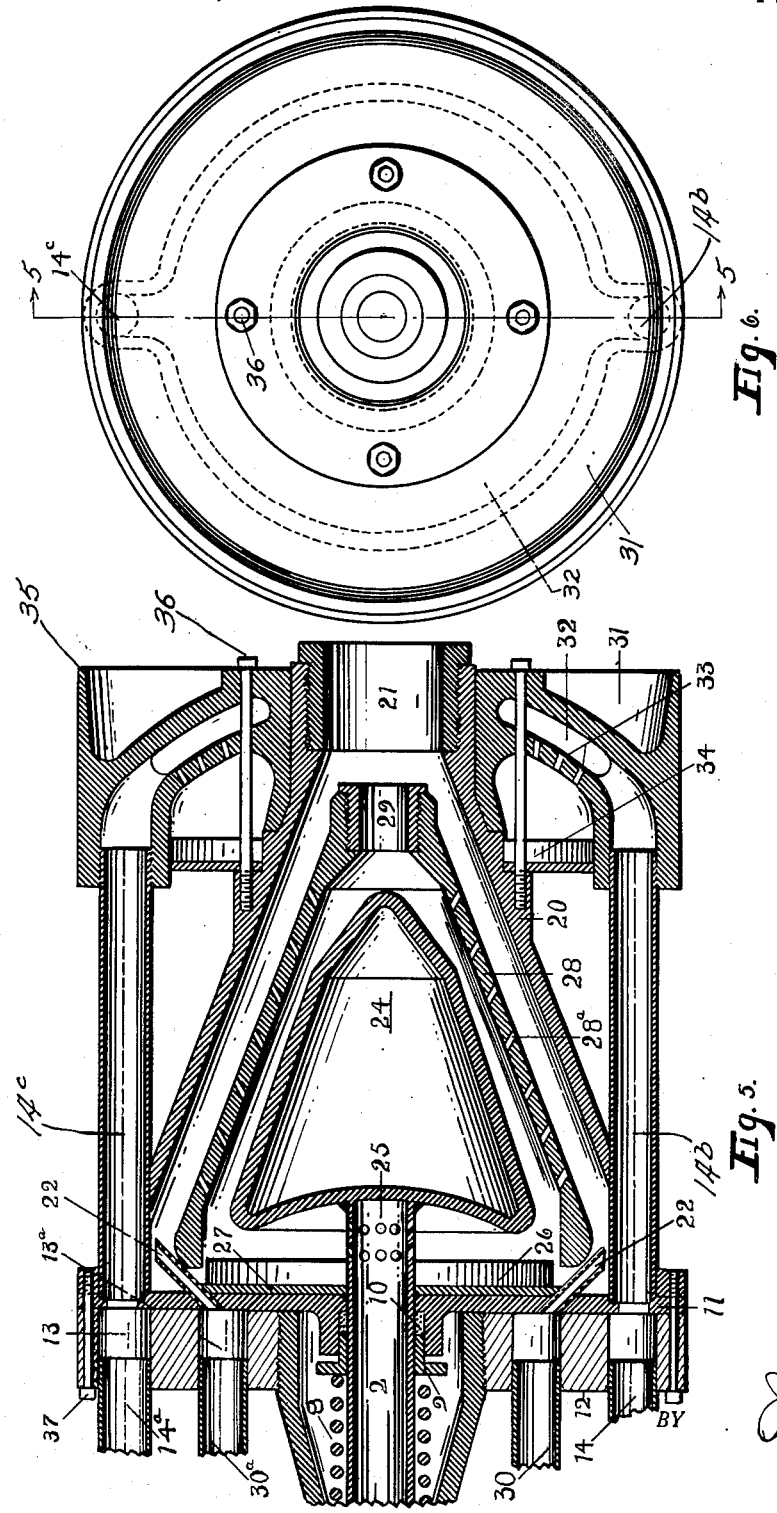

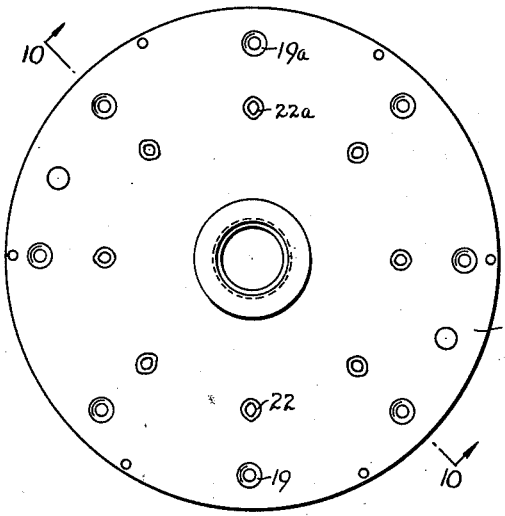
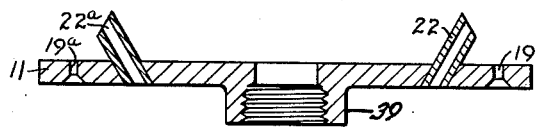
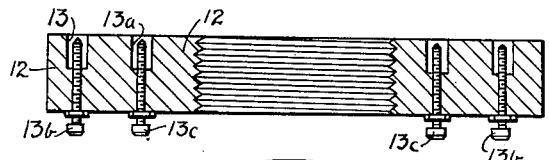
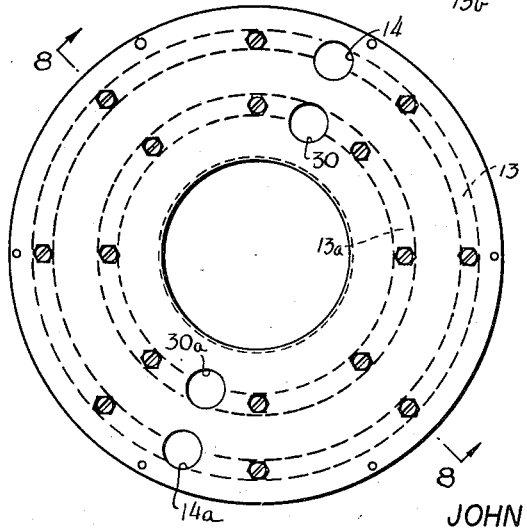

United States Patent Office 2,782,841
Patented Feb. 26, 1957

2,782,841

PROJECTOR FOR FUEL COMBUSTION

John E. Hale, Euclid, Ohio

Application November 3, 1950, Serial No. 193,765

7 Claims. (Cl. 158—76)

This invention relates to fuel burning projectors and, in particular, to a fuel burning projector which will assure complete combustion of all oxidizable elements of a fuel and thus attain a higher thermal efficiency than previously known devices.

One object of the invention is achieved through use of a plurality of spaced conical-shaped members coaxially disposed one within the other to provide internal chambers which are annular in section and which have diminishing cross-sectional area to provide passages in which fuel and air are mixed and through which fuel and air are directed at increasing velocity and from which fuel and air are thence ejected through a discharge orifice at the head of the cones. Thus, a fuel air mixture may be ejected from the orifice at a high velocity to aid in the provision of fuel suspension until the fuel is completely consumed.

A further object of the invention is to provide an apparatus which creates a turbulent fuel-air mixture flow by imparting a spiral movement to such flow, the turbulence serving to assure air suspension of fuel particles until they have been completely consumed.

A further object of the invention is to provide a mechanism which will permit relative adjustment of the coaxial cones to assure an appropriate mixture of fuel and air and thereby provide high thermal efficiency.

A further object of the invention is the provision of a double channel member having annular fuel and air supply channels or reliefs which communicate through a plurality of metered orifices with the annular chambers to provide appropriate and controllable quantities of fuel and air under pressure for mixture for combustion.

As a specialized objective of the present invention an auxiliary supply of spirally advancing air is provided to co-mingle in a combustion area with the fuel air mixture ejected from the nozzle to aid in suspending the fuel until it is completely consumed.

Further objects and advantages will be apparent to those skilled in the art from the following detailed description of the preferred embodiments of the invention representing the best known mode of practicing its principles and from the appended drawings which are to be considered part of the specification.

Fig. 1 is a side elevational view, partly in section and with parts broken away and removed, of a completed fuel burner assembly and connecting fuel and air passages;

Fig. 2 is a fragmentary cross-sectional view on an enlarged scale of the center adjusting cone, a portion of the center support tube, and the air distributor;

Fig. 3 is a front elevational view in the scale of Fig. 2 of the curved vane air distributing plate;

Fig. 4 is a side elevational view partly in section and in the scale of Fig. 1 of an assembled fuel burner, a combustion chamber and furnace or housing therefor and a slightly modified construction in which an auxiliary air supply member is employed;

Fig. 5 is a fragmentary cross-sectional view as seen in the plane indicated by line 5—5 of Fig. 6 on a scale enlarged with respect to Figs. 1 and 4 and smaller than the scale of Figs. 2 and 3, of the conical fuel-air mixing members, the auxiliary air supply member, and the air supply tubes for the auxiliary member;

Fig. 6 is a front elevational view of the fuel ejection end of the apparatus of Fig. 5 and in the scale of Fig. 5;

Fig. 7 is a rear elevational view of the collar or double channel member;

Fig. 8 is a cross-sectional view taken along line 8—8 of Fig. 7 of the collar or double channel member showing the fuel and air adjusting screws or chokes;

Fig. 9 is a rear elevational view of the disc or base member; and,

Fig. 10 is a cross-sectional view taken along line 10—10 of Fig. 9 of the disc or base member showing the fuel and air jets or orifices.

One form of suitable air supply for the present invention is provided in Fig. 1, where an externally threaded central air line or tube 2 is connected through a coupling 3, which may take the form of an ordinary pipe union, to a double branch pipe or air dispensing member 18 connected through fluid conduit 1 to a suitable source (not shown) of air under pressure.

A double channel or collar member 12 is concentrically disposed about the air line 2 in coaxial relationship. A pair of connecting air supply passages having a cylindrically shaped configuration are located near the periphery of the collar 12 to connect annular air supply channel or relief 13 to air supply lines 14. The air supply lines 14 and 14a which have smooth cylindrically contoured external surfaces are inserted at one end in slidable substantially airtight engagement with such cylindrical supply passages in the collar 12 to connect the lines or conduits 14 and 14a to the annular air supply relief or passage 13 in the collar.

The air lines or conduits 14 and 14a are connected at their other ends to expansion joints 15 and 15a respectively and thence to conduits 16 and 16a and unions 17 and 17a respectively. The unions or connectors 17 and 17a are connected to the air dispensing member 18. Thus, air under pressure from a suitable source is directed into the air dispensing member 18 and thence through the connection 3 to the central air line or conduit 2 and through the connecting passages formed by the connection 17, the conduit 16, the expansion joint 15, and the supply line 14 and by the connection 17a, the conduit 16a, the expansion joint 15a and the supply line 14a to the annular air supply passage 13.

A central adjustment or air control cone 24 is, at its concave base or large end, suitably affixed coaxially to central air conduit 2 which might properly be identified as a cone support mounting tube or an adjusting conduit member.

An annular plate member or base 11 is disposed circumferentially about the tube 2 in coaxial slidable engagement and in face-to-face relationship with the collar 12. One end of a housing or sleeve 6 is threaded or otherwise affixed to an internally threaded opening in the collar 12, while the other end of the housing is internally threaded to engage the threaded external surface of the tube 2.

An adjusting or hand wheel 4 having a threaded bore is screwed onto the tube 2 and suitably affixed in place as by a lock nut 5 or by pinning or the like.

The adjusting cone 24 may be shifted axially to a desired position by turning the hand wheel 4 and the connected tube 2 to screw the threads of the tube through the internally threaded portion of the housing 6. The embodiment shown and described affords sufficient adjustment for most applications of the unit by permitting the threaded engagement of the tube 2 to the union or connection 3 to vary, however, it is of course within the contemplated scope of the invention to employ any appropriate connection such as a suitable swivel and a section of flexing tubing, both of which have many variations well known in the art.

The plate 11 has coaxial annular flange 39. Preferably, an internally threaded collar 7 is affixed to the tube 2 to bias a spring 8 against a packing gland 9 and compress a packing 10. The packing 10 is disposed within an annular area defined by the inner surface of the flange 37 and the outer surface of the tube 2. Alternately the packing gland 9 may be externally threaded to engage internal threads provided in the inner flange 39 (Fig. 10) to compress the packing. Employment of the compressed spring 8 however is preferred since the spring compression will bias the entire adjustable portion of the apparatus and tend to hold it in a selected position.

An annular fuel supply channel or relief 13a is disposed in the collar in coaxial relationship with the collar 12 and with the annular air supply relief 13. Fuel supply conduits 30 and 30a having smooth cylindrically shaped external surfaces are provided to slidably engage appropriate openings in the collar 12 in fluid tight engagement to conduct fuel under appropriate pressure to the annular relief or passage 13a.

The plate 11 has a plurality of angularly or circumferentially spaced air passages 19 disposed through it and located in a circular pattern near its periphery. The air passages are arranged to communicate with the annular chamber 13 and to conduct air to a fuel air mixing chamber which will subsequently be described in more detail. A plurality of fuel discharge openings and connecting fuel discharge tubes or nozzles defining fuel passages or openings 22 are similarly provided and spaced in concentric circular pattern in the plate 11. The fuel openings 22 are arranged to connect the annular fuel supply relief 13a with the fuel air mixing chamber. Preferably the fuel passages 22 are correspondingly paired on radial lines with one of the air supply passages or orifices 19 in order that air ejected from the orifice 19 will pass the fuel passage 22 and comingle with fuel ejected therefrom.

A plurality of adjustment screws or chokes 13b are disposed through the collar 12 into the air relief 13 to control or meter the flow of air through the orifices 19. A plurality of similar adjustment screws or chokes 13c are disposed through the collar 12 into the annular fuel relief 13a to control or meter the flow of fuel through the fuel passages 22. Each of the adjustment screws 13b and 13c is equipped with an appropriate lock nut to assure firm securement of the set screws in an adjusted position.

A housing or outer cone 20 which has an inner conical shaped surface which defines a chamber is affixed at the periphery of its largest end to the collar 12 and the plate 11 by bolts 37 or other suitable means. The outer cone defines the peripheral extent of the fuel-air mixing chamber and has an ejection nozzle 21 at its small end through which a fuel-air mixture may be propelled into a combustion area which in Fig. 4 takes the form of a chamber 23 the extent of which is defined by suitable ceramic or other furnace wall material 40.

A circular disc or air distributor 27 having a plurality of air distribution vanes 26 is affixed to the plate 11. The large end of an intermediate or center cone 28 having a plurality of apertures 28a in its surface is affixed to the peripheral area of the disc 27. The smaller end of the intermediate cone is equipped with a nozzle 29 which is somewhat smaller in outside diameter than the inside diameter of the nozzle 21 with which it is concentric.

The inner cone 24, the housing or outer cone 20 and the intermediate cone 28 are arranged concentrically or coaxially one within the other to divide the housing chamber into inner and outer portions in the form of an annular fuel-air mixing chamber portion or passage 41 and an annular air transmission chamber portion or passage 42. While the cross-sectional area of the fuel-air passage 41 is of constantly decreasing dimension as the small end of the housing is approached, the radial thickness of the passage preferably remains relatively constant. In the air passage 42, on the other hand, the radial thickness of the passage preferably steadily diminishes to further reduce the cross-sectional area of the passage and hence increase the velocity inducing effects of the constricting passage.

The tube 10 has a plurality of through openings or orifices 25 located near the center cone. In operation, air under relatively high pressure is directed through the center tube and out through the orifices 25. The air is deflected rearwardly by a concave large end surface of the inner cone 24 which surface in its peripheral area forms an acute angle with the conically contoured surface of the center cone. Air thus directed rearwardly impinges against the disc 27 and assumes a spiral motion as it passes along the curved vanes 26. The air is thence directed outwardly both through orifices 28a into the annular passage 41 and through the annular passages 42 and the nozzle 29.

Air, under relatively high pressure and fuel under relatively low pressure are directed through orifices 19 and 22 respectively and comingled. As the air-fuel mixture passes through the annular passage 41, the high pressure air being ejected from the orifices 28a tends to impart a spiral turbulence to the fuel-air mixture and to hasten the passage of the mixture through the chamber 41. The Venturi-like action of air passing from the nozzle 29 tends to aid in the ejection of the fuel-air mixture through nozzle 21 and to further induce the turbulent condition in the combustion area. The mixture ejected from nozzle 29 has a high velocity due to the constricting Venturi-like effect of the decreasing cross-sectional areas of the annular chambers 41 and 42 which cause the velocity of the fluid mixture to increase as the nozzle 29 is approached.

Figs. 4 and 5 disclose an alternate embodiment of the invention in which an additional or supplemental supply of air is employed to aid in the creation of a turbulent condition in the combustion chamber 23 and to insure the attainment of the highest possible thermal efficiency by providing additional air to support combustion when a rich fuel-air mixture is ejected from the nozzle 21. A secondary or annular air flow member or device 31 having an internal annular air passage 32 is circumferentially disposed about the housing 20 and suitably affixed thereto as by bolts 36. Air under pressure is directed from the conduits 14 and 14a through the air relief 13 to tubes or conduits 14b and 14c (Figs. 5 and 6) and thence to the annular passage 32 in the interior of the annular member 31. A plurality of orifices or openings 33 conduict air under pressure from the annular passage 32 and direct the air against a curved vane air distributor 34 which is similar to the air distributor 27 and which imparts a spiral motion to the auxiliary air. The spirally moving air thence advances through an annular passage defined by the inner surface of the combustion chamber wall 40 and peripheral surface 35 of the annular member 31 into the combustion area or chamber 23.

A fuel burning device has thus been described which will create a fuel-in-air suspension under turbulent conditions to assure complete combustion of the fuel, which has adjustable or relatively moveable cones to provide appropriately sized fuel-air and air chamber portions, which will eject a fuel-air mixture into a combustion chamber at a high velocity, yet under turbulent conditions, which may have an auxiliary source of spirally advancing air which serves to support the fuel-air mixture until complete combustion is obtained and to aid in supporting combustion of the fuel, and which has annular fuel and air reliefs and choked supply orifices to provide adjustable fuel and air supply to the mixing chamber portion.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In a fuel burner of the type comprising a base member and a housing member defining a circular sectioned chamber into which air and fuel are introduced, the combination of an air distributor, an air control cone and mounting means for the latter, said air distributor being mounted on the base member at one end of the chamber and said control cone having a base confronting the distributor, the cone being mounted for axial movement toward and away from the distributor, the distributor including formations for directing air flow thereover to follow a substantially spiral course, and means associated with the cone mounting means for introducing air into the space between the base of the cone and the air distributor to flow radially out from such space into the chamber.

2. A fuel burner comprising a base member, coned members carried by the base member and defining a plurality of concentrically arranged annular chambers of circular section, means carried by said coned members defining coaxial outlets for the several chambers, a secondary member carried by one of the coned members, said secondary member being formed with an internal substantially annular air passage surrounding the outlet from one of the annular chambers, means including tubes extending through the base member and communicating with the annular air passage for supplying air to the latter, and a vaned member, said secondary member being formed with outlet openings spaced circumferentially about said annular passage to release a flow of secondary air against the vaned member, the vaned member being arranged to impart a spiral movement to the secondary air and to deflect the secondary air to cause it to spirally advance and co-mingle with air and fuel discharged from the outlets of the chambers.

3. A fuel burner comprising a plurality of coned members including an inner cone having a conical outer surface and a concave base surface the peripheral margin of which is disposed at an acute angle to such outer surface, means supporting the coned members in spaced relation concentrically one within another in the provision of annular chambers which taper from relatively large diameter base ends to relatively small diameter outlet ends, air conduit means, means to conduct air to flow radially outwardly from the air conduit means under the concave base of the inner cone and into the base end of one of the chambers, and means for introducing fluid fuel into the base end of another of the chambers, the chamber receiving the fuel extending axially beyond the outlet end of the chamber receiving the air for commingling of the air and fuel within the chamber receiving the fuel.

4. A fuel burner comprising inner and outer conical members, means mounting said members in spaced coaxial relation to provide therebetween a tapered annular chamber surrounding the inner conical member, means for introducing fuel and air into said chamber, and a perforated conical intermediate member interposed between and spaced from both the inner and the outer members, said intermediate member dividing the annular chamber into inner and outer portions, the outer portion being a fuel air mixing portion and the inner portion being an air transmission portion, the outer portion having a uniform radial thickness dimension from one end to the other, the inner portion being a tapering portion having diminishing radial thickness dimension from its larger diameter end to its smaller diameter end, the intermediate member being formed with an axial passage at its small diameter end in alignment with the outlet of the annular chamber.

5. A fuel burner comprising outer housing means having an internal conically walled chamber, a conical air control member within and spaced from the walls of the chamber providing therebetween a tapered annular passage of circular section between such control member and the chamber walls of the outer housing means, an intermediate member in the chamber surrounding the air control member and separated from the chamber wall and the air control member by annular spaces, means for introducing air into the chamber at the large diameter end of the air control member, the intermediate member being perforated to permit air to flow from one side to the other thereof, a nozzle outlet in one end of the intermediate member, said outlet being disposed to discharge air from the interior of the intermediate member into the housing chamber, and nozzle means carried by the housing means defining an outlet aligned with the outlet of the intermediate member.

6. A fuel burner comprising a plurality of members of circular cross-section disposed one within another in the provision of a plurality of concentrically arranged annular chambers, one of said members being disposed between and separating two of the chambers and being formed with radial openings providing communication between said two chambers, one of said members having a conical inwardly directed surface, another of said members having a conical outwardly directed surface in confronting spaced relation to the said conical surface of said one conically surfaced member, means mounting said other mmeber for axial movement relative to the said one conically surfaced member to vary the spacing between the confronting surfaces, a collar having a pair of concentric annular reliefs, one of the reliefs being an air supply passage and the other of the reliefs being a fuel supply passage, and a plurality of flow control passages connected to the reliefs for introducing fuel and air to be mixed, into the different chambers, the chambers having concentrically arranged outlets through which a fuel-air mixture may be ejected into a combustion zone.

7. A fuel burner comprising a generally flat base member having a plurality of air projecting orifices arranged substantially in one circle and a plurality of fuel projecting orifices arranged substantially in another circle concentric to the circle of air projecting orifices, a housing member attached to the base member over both orifice circles, said housing member having conical walls defining a conical chamber having its axis normal to the base member, a tube extending through the base member in coaxial relation to the chamber, an air control cone supported on the tube in coaxial relation to the chamber and spaced from the base member, the tube and cone being arranged so that air forced into the tube is discharged into the space between the cone and the base member, an intermediate hollow cone member surrounding the air control cone and spaced radially inwardly from the walls of the housing member, said intermediate member dividing the conical chamber into an outer portion with which one circle of orifices are in communication and an inner portion containing the air control cone, passage defining means for supplying air to the tube and to the circle of air projecting orifices, and passage defining means for supplying fuel to the circle projecting orifices.

References Cited in the file of this patent

UNITED STATES PATENTS

| | | |
|---|---|---|
| 818,256 | Kemp | Apr. 17, 1906 |
| 938,182 | Todd et al. | Oct. 26, 1909 |
| 1,462,395 | Thompson | July 17, 1923 |
| 1,519,462 | Loker | Dec. 16, 1924 |
| 1,673,194 | Hortvet | June 12, 1928 |
| 1,726,870 | Trent | Sept. 3, 1929 |
| 1,769,197 | Wetmore | July 1, 1930 |
| 1,791,285 | Roberts | Feb. 3, 1931 |
| 1,853,277 | Johnston | Apr. 12, 1932 |

FOREIGN PATENTS

| | | |
|---|---|---|
| 294,042 | Germany | Sept. 9, 1916 |
| 93,112 | Switzerland | Mar. 1, 1922 |